(12) United States Patent
Shinohara et al.

(10) Patent No.: US 9,100,965 B2
(45) Date of Patent: *Aug. 4, 2015

(54) APPARATUS AND METHOD FOR MULTIPLEXING DATA OF A LAYER INTO DATA TRANSMISSION UNIT OF ANOTHER LAYER

(71) Applicant: FUJITSU LIMITED, Kawasaki-shi, Kanagawa (JP)

(72) Inventors: Chiaki Shinohara, Fukuoka (JP); Kazuhisa Obuchi, Kawasaki (JP); Akihide Otonari, Fukuoka (JP); Yoshinori Soejima, Fukuoka (JP); Manabu Kubota, Fukuoka (JP); Miki Yamasaki, Fukuoka (JP); Shinya Okamoto, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,380

(22) Filed: Feb. 4, 2014

(65) Prior Publication Data

US 2014/0153520 A1    Jun. 5, 2014

Related U.S. Application Data

(63) Continuation of application No. 13/021,042, filed on Feb. 4, 2011, now Pat. No. 8,681,670, which is a continuation of application No. PCT/JP2008/064364, filed on Aug. 8, 2008.

(51) Int. Cl.
*H04B 7/00* (2006.01)
*H04W 72/04* (2009.01)
(Continued)

(52) U.S. Cl.
CPC ........... *H04W 72/046* (2013.01); *H04L 69/324* (2013.01); *H04W 28/065* (2013.01); *H04W 72/1231* (2013.01); *H04W 72/1263* (2013.01)

(58) Field of Classification Search
CPC ..... H04W 80/02; H04W 80/04; H04W 80/06; H04W 80/08
USPC ........ 370/310, 312, 431, 437, 464, 465, 474; 455/422, 450, 452, 455
See application file for complete search history.

(56) References Cited

U.S. PATENT DOCUMENTS 7,403,541 B2 * 7/2008 Yi et al. .................... 370/469
7,492,789 B2 * 2/2009 Shvodian ................. 370/469
(Continued)

FOREIGN PATENT DOCUMENTS

| CN | 1754373 | 3/2006 |
|---|---|---|
| CN | 101064724 | 10/2007 |

(Continued)

OTHER PUBLICATIONS

Extended European Search Report issued for corresponding European Patent Application No. 08792348.8 dated Sep. 19, 2014.
(Continued)

*Primary Examiner* — Dmitry H Levitan
(74) *Attorney, Agent, or Firm* — Myers Wolin, LLC

(57) ABSTRACT

A communication apparatus includes an acquisition unit that acquires a size of free space provided in each of a plurality of data transmission units of a first layer; an allocation unit that allocates to data of a second layer a contiguous sequence of free space from among the free space whose size is acquired by the acquisition unit, the contiguous sequence of free space being equal in size to the data of the second layer and provided in one data transmission unit of the first layer; and a multiplexing unit that multiplexes a plurality of pieces of data of the second layer into the plurality of data transmission units of the first layer according to the allocation of the free space by the allocation unit.

5 Claims, 9 Drawing Sheets

(51) Int. Cl.
*H04W 28/06* (2009.01)
*H04L 29/08* (2006.01)
*H04W 72/12* (2009.01)

(56) References Cited

U.S. PATENT DOCUMENTS

| | | | |
|---|---|---|---|
| 7,953,115 B2 | 5/2011 | Nataga et al. | |
| 2003/0131124 A1 | 7/2003 | Yi et al. | |
| 2004/0142698 A1 | 7/2004 | Pietraski | |
| 2005/0100048 A1* | 5/2005 | Chun et al. | 370/468 |
| 2006/0153232 A1 | 7/2006 | Shvodian | |
| 2007/0091810 A1* | 4/2007 | Kim et al. | 370/236 |
| 2007/0253447 A1 | 11/2007 | Jiang | |
| 2007/0286066 A1 | 12/2007 | Zhang et al. | |
| 2009/0086709 A1* | 4/2009 | Pani et al. | 370/349 |

FOREIGN PATENT DOCUMENTS

| | | |
|---|---|---|
| EP | 1 764 980 A1 | 3/2007 |
| JP | 02-090823 | 3/1990 |
| JP | 07-193578 | 7/1995 |
| JP | 2006-074555 | 3/2006 |
| JP | 2007-300630 | 11/2007 |
| JP | 2008-113095 | 5/2008 |
| JP | 2008-538480 | 10/2008 |
| WO | 03/061217 | 7/2003 |
| WO | 2004/042982 A2 | 5/2004 |
| WO | 2004/079971 | 9/2004 |
| WO | 2004/114609 | 12/2004 |
| WO | 2005/083951 | 9/2005 |
| WO | 2006/118435 | 11/2006 |
| WO | 2008/041296 | 4/2008 |

OTHER PUBLICATIONS

NTT DoCoMo, Inc., "RLC segmentation and concatenation", Agenda Item 5.1.2.6, 3GPP TSG RAN WG2 #61, R2-081159, Sorrento, Italy, Feb. 11-15, 2008.
International Search Report issued for corresponding international Patent Application No. PCT/JP2008/064364, mailed Oct. 7, 2008. English translation attached.
3GPP TS 36.323 V8.2.1; 3rd Generation Partnership Project; Technical Specification Group Radio Access Network; Evolved Universal Terrestrial Radio Access (E-UTRA); Packet Data Convergence Protocol (PDCP) specification; (Release 8); Dated May 2008. [URL:http://www.3gpp.org/ftp/Specs/archive/36_series/36.323/36323-821.zip>].
3GPP TS 36.322 V8.2.0; 3rd Generation Partnership Project; Technical Specification Group Radio Access Network; Evolved Universal Terrestrial Radio Access (E-UTRA) Radio Link Control (RLC) protocol specification, (Release 8); Dated May 2008. [URL:http://www.3gpp.org/ftp/Specs/archive/36_series/36.322/36322-820.zip>].
3GPP TS 36.321 V8.2.0; 3rd Generation Partnership Project; Technical Specification Group Radio Access Network; Evolved Universal Terrestrial Radio Access (E-UTRA) Medium Access Control (MAC) protocol specification; (Release 8); Dated May 2008. [URL:http://www.3gpp.org/ftp/Specs/archive/36_series/36.321/36321-820.zip].
3GPP TS 36.300 V8.5.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 8); Dated May 2008. [URL:http://www.3gpp.org/ftp/Specs/archive/36_series/36.300/36300-850.zip>].
Australian Patent Examination Report No. 1 issued for corresponding Australian Patent Application No. 2008360228, issued Dec. 10, 2012.
First Notification of Office Action issued for corresponding Chinese Patent Application No. 200880130645.X, issued Feb. 4, 2013 with an English translation.
Notice of Rejection issued for corresponding Japanese Patent Application No. 2010-523709 mailed May 29, 2012 with English translation.
Official Office Action issued for corresponding Russian Patent Application No. 2011108546 dated May 21, 2012 with English translation.
Notice of Rejection for Japanese Patent Application No. 2012-168854, mailed Jul. 30, 2013, with full English translation.
Official Action issued for corresponding Russian patent application No. 2012135278/07(056522) on Oct. 16, 2013, with English translation.
Office Action issued for corresponding Australian Patent Application No. 2014201624 issued on Jan. 22, 2015.
Office Action issued for corresponding Australian Patent Application No. 2014201624 mailed on May 15, 2015.

\* cited by examiner

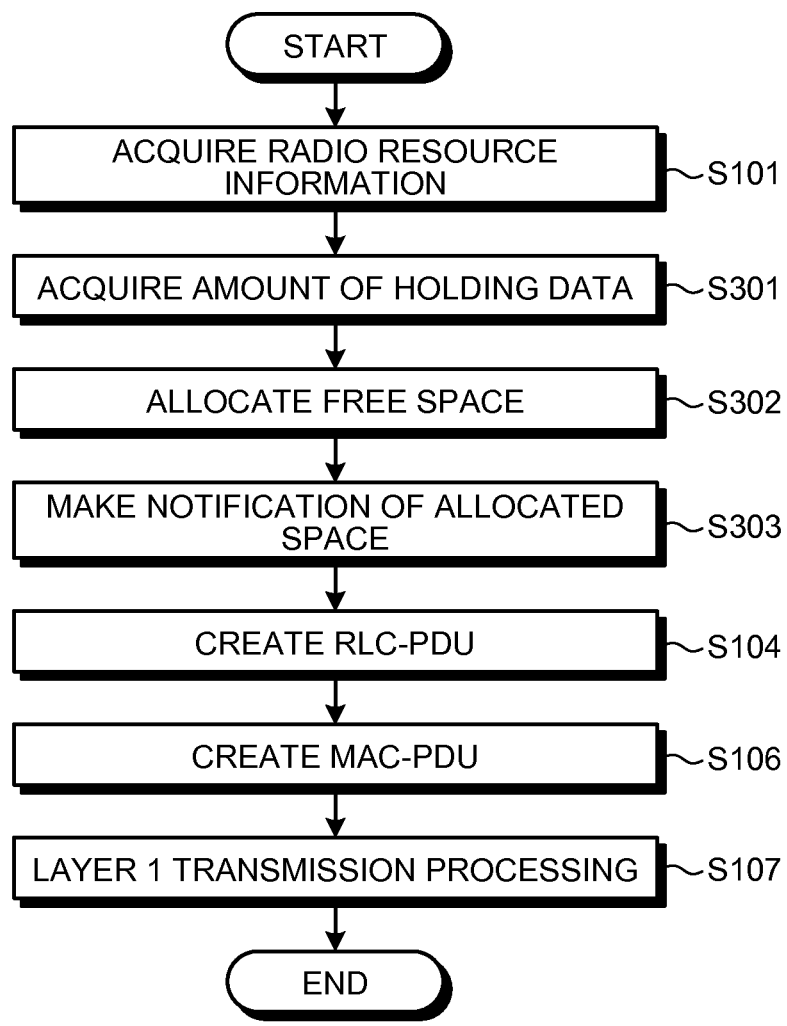

APPARATUS AND METHOD FOR MULTIPLEXING DATA OF A LAYER INTO DATA TRANSMISSION UNIT OF ANOTHER LAYER

CROSS-REFERENCE TO RELATED APPLICATION

This application is a continuation of U.S. application Ser. No. 13/021,042 filed Feb. 4, 2011, which is a continuation of International Application No. PCT/JP2008/064364, filed on Aug. 8, 2008, the entire contents of which are incorporated herein by reference.

FIELD

The embodiments discussed herein are directed to a communication apparatus and a transmission data generation method.

BACKGROUND

In recent years, a communication specification called Long Term Evolution (LTE) is much discussed as a new radio communication system standard. LTE has come to the attention of the 3rd Generation Partnership Project (3GPP), which is one of the communication standardization projects, and, for example, improvement of Layer 2 corresponding to the data link layer is in progress there.

SUMMARY

According to an aspect of an embodiment discussed herein, a communication apparatus includes an acquisition unit that acquires a size of free space provided in each of a plurality of data transmission units of a first layer, an allocation unit that allocates to each of a plurality of pieces of data of a second layer a contiguous sequence of free space from among the free space whose size is acquired by the acquisition unit, the contiguous sequence of free space being equal in size to each piece of data and provided in one data transmission unit among the plurality of data transmission units, and a multiplexing unit that multiplexes the plurality of pieces of data of the second layer into the plurality of data transmission units of the first layer according to the allocation of the free space by the allocation unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 10 is a flow chart illustrating the transmission data generation method related to the third embodiment.

DESCRIPTION OF EMBODIMENTS

[a] First Embodiment

Figure 1:
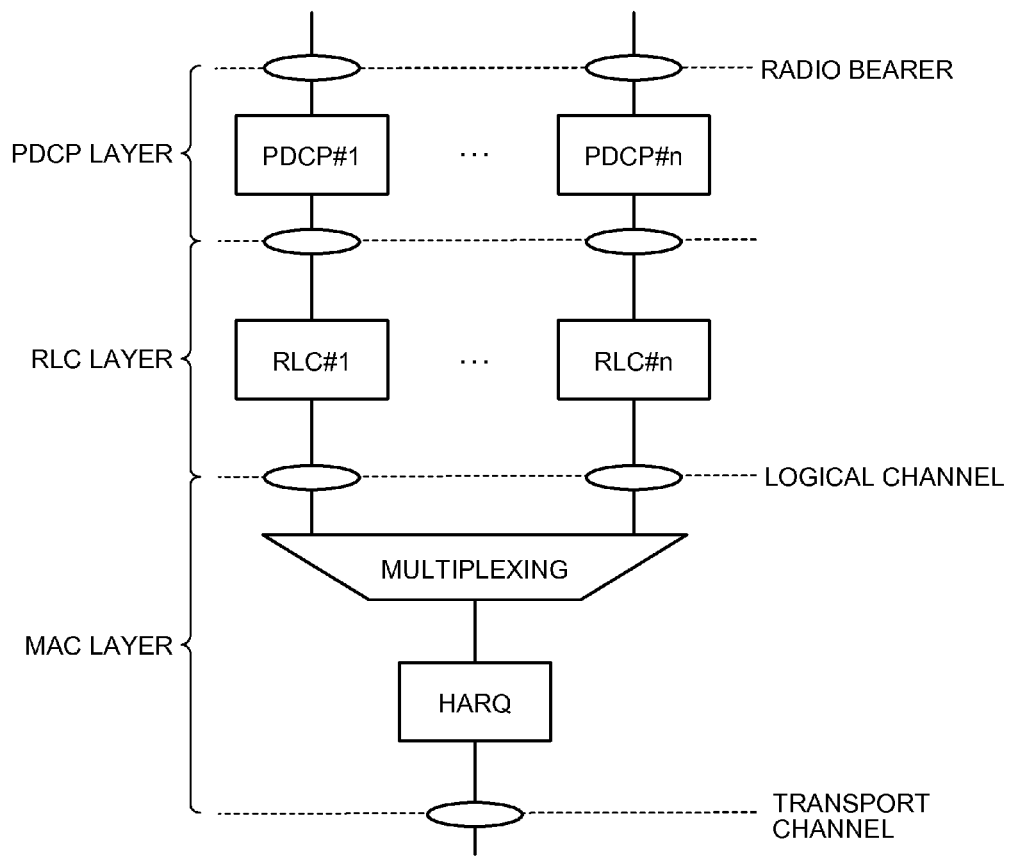
FIG. 1 is a diagram illustrating a configuration of Layer 2 in LTE.

As illustrated in FIG. 1, Layer 2 in LTE includes three sub-layers of (1) the Packet Data Convergence Protocol (PDCP) layer, (2) the Radio Link Control (RLC) layer, and (3) the Medium Access Control (MAC) layer. PDCP entities and RLC entities belonging to the PDCP layer and the RLC layer respectively are present in a quantity of as many as the number (n in FIG. 1) of logical channels (LCH: Logical CHannel) used for radio communication and there is a one-to-one correspondence there between. In each of the n PDCP entities, a PDCP layer header is added to transmission data, thus obtaining a Packet Data Unit (PDU) of the PDCP layer, which is output to the corresponding RLC entity. The PDU becomes a Service Data Unit (SDU) in the RLC layer and after an RLC layer header is added by each RLC entity, a PDU of the RLC layer is obtained. That is, if a PDU of an upper sub-layer is output to a lower sub-layer, the PDU is handled as an SDU of the lower sub-layer. Then, if the header of each sub-layer is added to the SDU in the lower sub-layer, a PDU of the lower sub-layer is obtained.

If a PDU of the RLC layer (hereinafter, referred to as "RLC-PDU") is output from each RLC entity to the MAC layer, these RLC-PDUs are multiplexed and become a PDU of the MAC layer (hereinafter, referred to as "MAC-PDU") after MAC layer headers are added thereto. Layer 1 processing corresponding to the physical layer is performed thereon before being transmitted. At this point, a MAC entity belonging to the MAC layer decides the size of the free space in a MAC-PDU from radio resources such as the bandwidth and power available for transmission of data and allocates the RLC-PDU output from each of n RLC entities to the free space of the MAC-PDU for multiplexing when appropriate.

Figure 2:
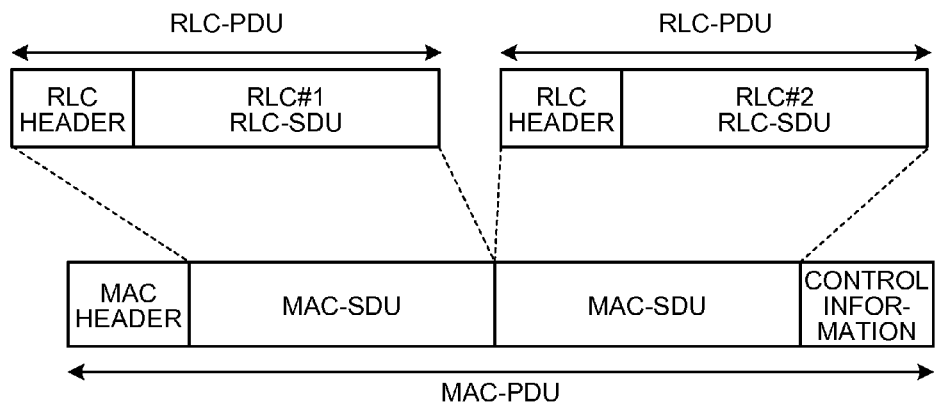
FIG. 2 is a diagram illustrating correspondences of data configurations between layers.

That is, as illustrated, for example, in FIG. 2, an RLC-PDU obtained by adding the RLC header to an SDU in the first RLC entity (hereinafter, referred to as "RLC#1") and an RLC-PDU obtained by adding the RLC header to an SDU in the second RLC entity (hereinafter, referred to as "RLC#2") are each handled as MAC-SDUs for multiplexing in the MAC layer. The header in the MAC layer (MAC header) and control information are added to the two multiplexed MAC-SDUs to obtain a MAC-PDU.

The obtained MAC-PDU is transmitted after Layer 1 processing (not illustrated) is performed thereon. In the MAC layer, retransmission control by a hybrid automatic repeat request (HARQ: Hybrid Automatic Repeat reQuest) using Stop & Wait composed of n channels is also exercised. In HARQ in the MAC layer, a MAC-PDU is maintained during transmission and also error correction processing and Cyclic Redundancy Check (CRC) coding are performed on the MAC-PDU. If a reception result of a MAC-PDU is unacceptable for reception (that is, an error detection result by CRC code is unacceptable), the receiving side returns a NACK to the sending side indicating the unacceptability. On the other hand, if a reception result of a MAC-PDU is acceptable for reception (that is, an error detection result by CRC code is acceptable), the receiving side returns an ACK to the sending side indicating the acceptability. If a NACK is received, the MAC-PDU maintained from the initial transmission is retransmitted by the MAC layer by the sending side. If an ACK is received, the MAC-PDU maintained from the initial transmission is discarded.

If an ACK is not returned after repeatedly retransmitting one MAC-PDU a given maximum number of retransmission times, the relevant MAC-PDU is also discarded. In preparation for such a case, retransmission control by an automatic repeat request (ARQ) using Poll/Status information is exercised in the RLC layer. More specifically, the RLC layer on the sending side adds Poll information to an RLC-PDU and transmits the RLC-PDU to request Status information from the RLC layer on the receiving side. The RLC layer on the receiving side detects the Poll information from the received RLC-PDU, checks for missing RLC-PDU(s) from the sequence numbers of the RLC-PDU(s) received to date, and creates Status information and transmits the Status information to the RLC layer on the sending side. The RLC layer on the sending side retransmits RLC-PDU(s) missing on the receiving side based on the received Status information.

The free space size of a MAC-PDU is decided in accordance with radio resources and changes every moment so that RLC-PDUs may not always be multiplexed in proper quantities in the free space of a MAC-PDU. Thus, one RLC-PDU may be divided so that each of RLC-PDUs obtained by division may be multiplexed into free space of different MAC-PDUs. More specifically, as illustrated, for example, in FIG. 3, a case will be considered when four PDUs of the PDCP layer (hereinafter, referred to as "PDCP-PDU") with mutually different sizes are multiplexed into two MAC-PDUs (MAC-PDU#1 and MAC-PDU#2) for transmission. Priorities in accordance with the importance of data or Quality of Service (QoS) are given to the four PDCP-PDUs.

In such a case, RLC#1 that has acquired the PDCP-PDU with the highest priority attaches the header (indicated by "H" in FIG. 3) to the PDCP-PDU to multiplex the RLC-PDU (RLC-PDU#1) into MAC-PDU#1.The RLC-PDU with the second highest priority will be multiplexed into the remaining space of the MAC-PDU#1,but the size of the free space of the MAC-PDU#1 is insufficient and RLC#2 that has acquired the PDCP-PDU with the second highest priority divides the PDCP-PDU and sets each divided PDCP-PDU as a RLC-SDU. That is, a header is attached to each of the two RLC-SDUs obtained by dividing one PDCP-PDU.

Then, the RLC#2 multiplexes one RLC-PDU#2-1 obtained by adding the header thereto into the MAC-PDU#1 and the other RLC-PDU#2-2 into the MAC-PDU#2. Thus, the PDCP-PDU with the second highest priority is divided and the two obtained RLC-PDU#2-1 and RLC-PDU#2-2 are multiplexed into free space of the MAC-PDU#1 and MAC-PDU#2 respectively. Then, RLC-PDU#3 containing the whole PDCP-PDU with the third highest priority and RLC-PDU#4 containing a portion of the PDCP-PDU with the fourth highest priority are multiplexed into the remaining space of the MAC-PDU#2.

However, if a PDCP-PDU is divided and each of the divided PDCP-PDUs becomes an RLC-SDU, an RLC header will be added to each RLC-SDU, thus, increasing the space of a MAC-PDU allocated to the header. That is, radio resources consumed for transmitting headers attached to RLC-SDUs will increase. The header is not data containing information to be transmitted and thus, if the proportion occupied by headers of the RLC layer in MAC-PDUs increases, there is a problem of decreasing transmission efficiency of data. In other words, if one PDCP-PDU is divided and the number of RLC-SDUs is thereby increased, data throughput decreases. At the same time, it becomes necessary for the receiving side to couple and reassemble a plurality of RLC-SDUs into one PDCP-PDU and therefore, RLC layer processing loads also increase on the receiving side with an increasing number of divided PDCP-PDUs.

Figure 3:
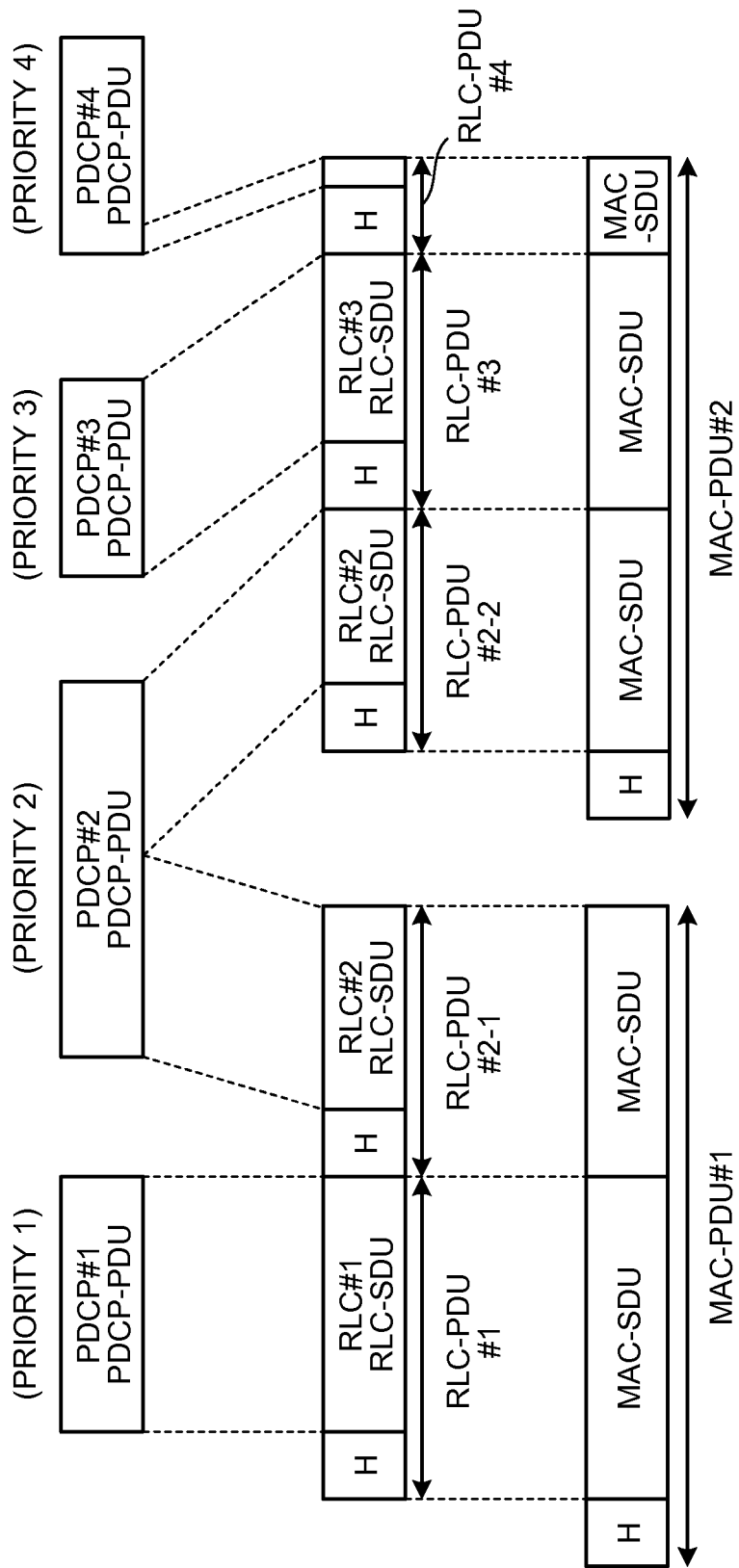
FIG. 3 is a diagram illustrating a concrete example of transmission data generation in Layer 2.

In the example illustrated in FIG. 3 described above, the PDCP-PDU with the second highest priority is divided into two PDCP-PDUs and thus, unless both the MAC-PDU#1 and MAC-PDU#2 are correctly received on the receiving side, the PDCP-PDU with the second highest priority may not be reassembled. On the other hand, the PDCP-PDU with the third highest priority may be obtained on the receiving side if only MAC-PDU#2 is correctly received. That is, the PDCP-PDU with the second highest priority is less likely to be transmitted to the receiving side correctly than the PDCP-PDU with the third highest priority. This could cause a frequent retransmission of a PDCP-PDU with a higher priority as compared to the lower priority PDCP-PDU, so that requirements of QoS corresponding to priorities may not be satisfied.

Figure 4:
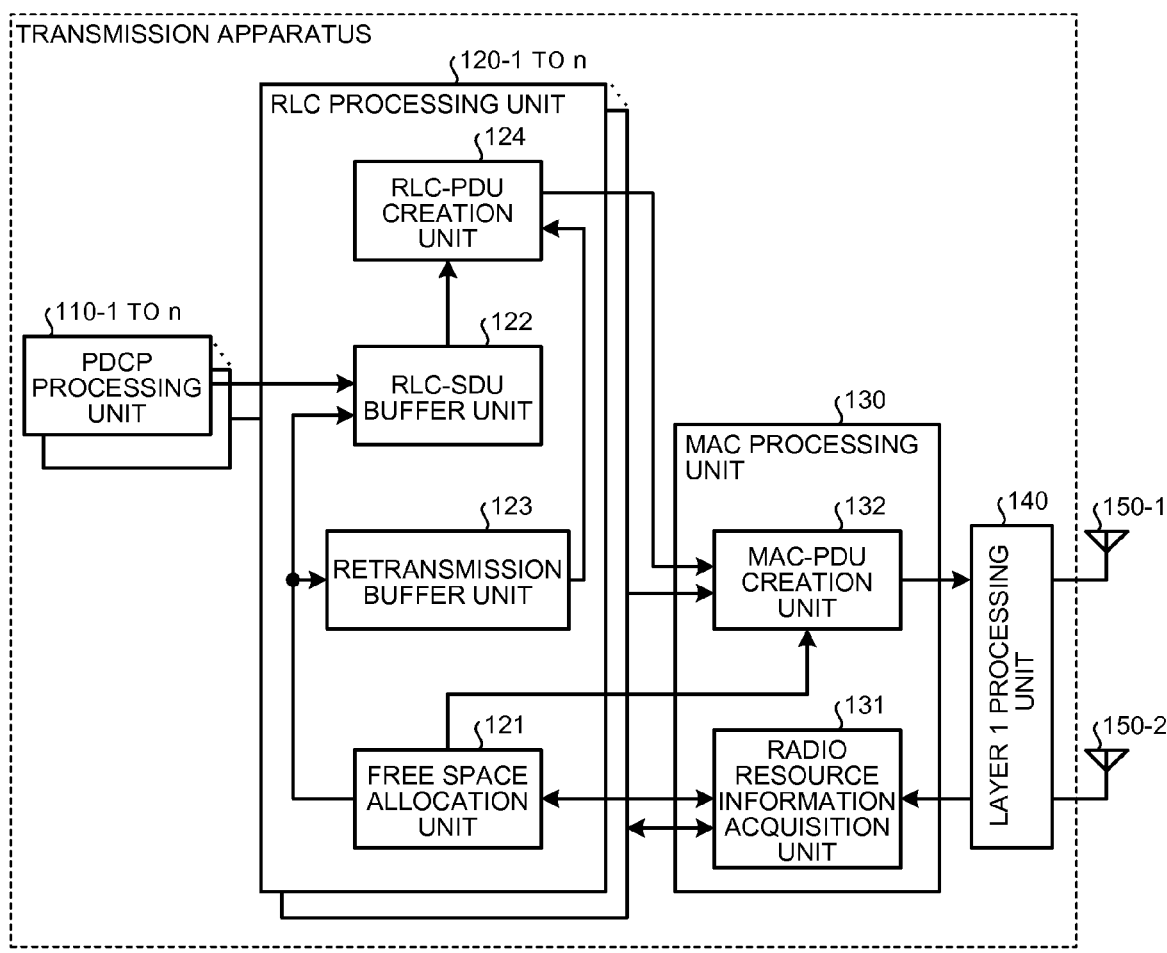
FIG. 4 is a block diagram illustrating main components of a transmission apparatus according to a first embodiment.

FIG. 4 is a block diagram illustrating main components of a transmission apparatus according to a first embodiment. The transmission apparatus illustrated in FIG. 4 includes PDCP processing units 110-1 to 110-$n$ ($n$ is an integer equal to 1 or greater), RLC processing units 120-1 to 120-$n$, a MAC processing unit 130, a Layer 1 processing unit 140, and antennas 150-1 and 150-2.

The PDCP processing units 110-1 to 110-$n$ each add the header of the PDCP layer to an SDU by setting transmission data as the SDU of the PDCP layer. Then, the PDCP processing units 110-1 to 110-$n$ output the PDCP-PDU, obtained by adding the header, to the corresponding RLC processing units 120-1 to 120-$n$. The PDCP processing units 110-1 to 110-$n$ correspond to PDCP-PDUs whose priorities are the first to the $n$-th respectively. In the present embodiment, the PDCP processing unit 110-1 corresponds to the PDCP-PDU with the highest priority and the PDCP processing unit 110-$n$ to the PDCP-PDU with the lowest priority. Therefore, regarding the RLC processing units 120-1 to 120-$n$ described later, the RLC processing unit 120-1 similarly corresponds to the RLC-PDU with the highest priority and the RLC processing unit 120-$n$ to the RLC-PDU with the lowest priority.

The RLC processing units 120-1 to 120-$n$ set PDCP-PDUs output from the PDCP processing units 110-1 to 110-$n$ as SDUs of the RLC layer (hereinafter, referred to as "RLC-SDU") and create RLC-PDUs by adding the header of the RLC layer to the RLC-SDUs. At this point, the RLC processing units 120-1 to 120-$n$ create RLC-PDUs in such a way that division of RLC-SDUs is reduced to a minimum based on free space information notified from the MAC processing unit 130. More specifically, each of the RLC processing units 120-1 to 120-$n$ includes a free space allocation unit 121, an RLC-SDU buffer unit 122, a retransmission buffer unit 123, and an RLC-PDU creation unit 124.

Free space information indicates the free space in a MAC-PDU that may be allocated to RLC-PDUs created by the RLC processing units 120-1 to 120-$n$. When free space information is notified from the MAC processing unit 130, the free space allocation unit 121 allocates the free space of a MAC-PDU to new RLC-SDUs or to RLC-PDUs already transmitted, which are to be retransmitted (hereinafter, data units before the RLC layer header is added may collectively be referred to simply as "RLC-SDU").

In this example, the free space allocation unit 121 preferentially allocates the free space of a MAC-PDU to an RLC-SDU which may be allocated without division. If an RLC-PDU to be retransmitted is held in the retransmission buffer unit 123, the free space allocation unit 121 preferentially allocates free space to the RLC-PDU to be retransmitted over a new RLC-SDU. Further, if there is RLC layer control information waiting to be transmitted, the free space allocation unit 121 preferentially allocates free space to the RLC layer control information waiting to be transmitted over new or retransmission RLC-SDUs.

The maximum free space size of a MAC-PDU is defined by radio resources of, for example, the bandwidth or power. In the present embodiment, the total size of the space where data is multiplexed inside two MAC-PDUs transmitted simultaneously by the antennas 150-1 and 150-2 becomes the maximum free space size of a MAC-PDU. If the space of a MAC-PDU is already allocated to an RLC-SDU by another RLC processing unit, the free space size of the MAC-PDUs of which the RLC processing unit is notified becomes smaller accordingly.

The free space allocation unit 121 notifies the RLC-SDU buffer unit 122 and the retransmission buffer unit 123, which temporarily store data or perform processing thereon, of the allocation space of a MAC-PDU allocated to RLC-SDU and also notifies the MAC processing unit 130 thereof.

The RLC-SDU buffer unit 122 temporarily holds PDCP-PDUs output from the PDCP processing units 110-1 to 110-n as new RLC-SDUs. Then, the RLC-SDU buffer unit 122 outputs a new RLC-SDU in accordance with the allocation space notified from the free space allocation unit 121. That is, if the size of allocation space notified from the free space allocation unit 121 is equal to the size of one RLC-SDU or more, the RLC-SDU buffer unit 122 outputs an entire new RLC-SDU to the RLC-PDU creation unit 124. On the other hand, if the size of allocation space notified from the free space allocation unit 121 is less than the size of one RLC-SDU, the RLC-SDU buffer unit 122 divides the new RLC-SDU and outputs a portion of the RLC-SDU equal to the size of allocation space notified from the free space allocation unit 121 to the RLC-PDU creation unit 124.

However, if there is any RLC-PDU to be retransmitted or control information to be preferentially transmitted over the new RLC-SDU, the RLC-SDU buffer unit 122 does not output any RLC-SDU because the RLC-PDU to be retransmitted or control information is preferentially transmitted.

The retransmission buffer unit 123 temporarily holds RLC-PDUs transmitted from the antennas 150-1/150-2 and multiplexed into MAC-PDUs in preparation for retransmission. The retransmission buffer unit 123 outputs an RLC-PDU to be retransmitted in accordance with the allocation space notified from the free space allocation unit 121. That is, if the size of allocation space notified from the free space allocation unit 121 is equal to the size of one RLC-SDU or more, the retransmission buffer unit 123 outputs the whole RLC-PDU to be retransmitted to the RLC-PDU creation unit 124. On the other hand, if the size of allocation space notified from the free space allocation unit 121 is less than the size of one RLC-PDU to be retransmitted, the retransmission buffer unit 123 divides the RLC-PDU and outputs a portion of the RLC-PDU equal to the size of allocation space to the RLC-PDU creation unit 124.

However, if there is control information to be preferentially transmitted over an RLC-PDU to be retransmitted, the retransmission buffer unit 123 does not output any RLC-PDU to be retransmitted because the control information is preferentially transmitted.

The RLC-PDU creation unit 124 adds an appropriate RLC layer header to an RLC-SDU output from the RLC-SDU buffer unit 122 or the retransmission buffer unit 123 to create an RLC-PDU. If an RLC-PDU to be retransmitted is divided to fit to the size of allocation space and a portion thereof is output from the retransmission buffer unit 123 as a new RLC-SDU, the RLC-PDU creation unit 124 recreates a RLC layer header indicating that the RLC-PDU has been divided anew and adds the header thereto. Then, the RLC-PDU creation unit 124 outputs the created RLC-PDU to the MAC processing unit 130.

The MAC processing unit 130 decides the size of free space for a MAC-PDU based on radio resources of, for example, the bandwidth or power available for transmission of data and allocation conditions of space of a MAC-PDU by each of the RLC processing units 120-1 to 120-n. The MAC processing unit 130 notifies the RLC processing units 120-1 to 120-n of the size of the free space as free space information. The MAC processing unit 130 creates MAC-PDUs by multiplexing RLC-PDUs output from the RLC processing units 120-1 to 120-n. More specifically, the MAC processing unit 130 includes a radio resource information acquisition unit 131 and a MAC-PDU creation unit 132.

The radio resource information acquisition unit 131 acquires information about radio resources available for transmission of data from each of the antennas 150-1 and 150-2 to decide the maximum free space size of a MAC-PDU transmitted from the two antennas based on the radio resources information. When allocation space is notified from the free space allocation unit 121 of the RLC processing units 120-1 to 120-n, the radio resource information acquisition unit 131 subtracts the size of the allocation space from the size of free space for a MAC-PDU to decide the new free space size for the MAC-PDU. Then, the radio resource information acquisition unit 131 outputs free space information containing the newly decided free space size to the free space allocation unit 121 of the RLC processing unit with the highest priority among the RLC processing units that have not been notified of the free space information indicating the size of free space of a MAC-PDU.

For example, if none of the RLC processing units 120-1 to 120-n was notified of free space information, the radio resource information acquisition unit 131 notifies the free space allocation unit 121 of the RLC processing unit 120-1 of the maximum size of the free space for a MAC-PDU. After the RLC processing unit 120-1 is notified of the free space information, the radio resource information acquisition unit 131 subtracts the size of allocation space allocated to the RLC-PDU in the RLC processing unit 120-1 from the maximum size of free space and notifies the free space allocation unit 121 of the RLC processing unit 120-2 of the remaining size of the free space.

The MAC-PDU creation unit 132 multiplexes the RLC-PDU output from the RLC-PDU creation unit 124 of each of the RLC processing units 120-1 to 120-n as a MAC-SDU and adds the MAC layer header to create a MAC-PDU. At this point, the MAC-PDU creation unit 132 multiplexes RLC-PDUs according to the allocation space notified from the free space allocation unit 121 of each of the RLC processing units 120-1 to 120-n. Thus, two MAC-PDUs created by the MAC-PDU creation unit 132 contain a minimum amount of divided RLC-SDUs so that the space occupied by headers of the RLC layer in MAC-PDUs is minimized.

The Layer 1 processing unit 140 controls the bandwidth and power in the antennas 150-1 and 150-2 and provides radio resource information to the radio resource information acquisition unit 131 of the MAC processing unit 130. The Layer 1 processing unit 140 simultaneously transmits the two MAC-PDUs created by the MAC-PDU creation unit 132 of the MAC processing unit 130 from the different antennas 150-1 and 150-2. That is, the Layer 1 processing unit 140 performs Multi Input Multi Output (MIMO) communication that simultaneously transmits different data from a plurality of antennas. MAC-PDUs are simultaneously transmitted from the two antennas 150-1 and 150-2 in the present embodiment, but MAC-PDUs may simultaneously be transmitted from three antennas or more. In such a case, the total of the free space of as many MAC-PDUs as the number of antennas becomes the space to be allocated to RLC-SDUs in the RLC processing units 120-1 to 120-$n$.

Figure 5:
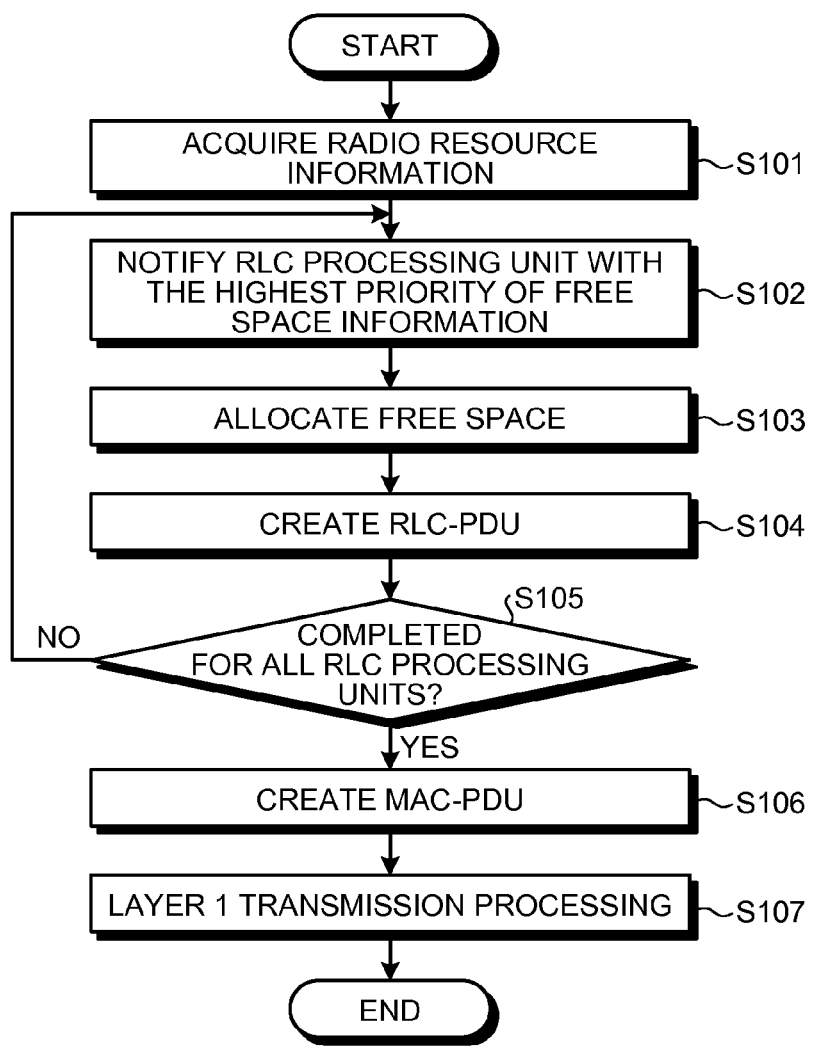
FIG. 5 is a flow chart illustrating a transmission data generation method related to the first embodiment.

A transmission data generation method by a transmission apparatus configured similarly as the transmission apparatus described above will be described with reference to the flow chart in FIG. 5.

Radio resources in each of the antennas 150-1 and 150-2 constantly change and thus, the radio resource information acquisition unit 131 acquires radio resource information concerning each of the antennas 150-1 and 150-2 via the Layer 1 processing unit 140 (step S101). Then, the radio resource information acquisition unit 131 decides the maximum size of the free space of the MAC-PDU corresponding to each of the antennas 150-1 and 150-2 from the radio resource information. The RLC processing unit with the highest priority among the RLC processing units not already notified of the free space information is notified of the free space information decided by the radio resource information acquisition unit 131 and indicating the size of free space (step S102). Here in this example, no RLC processing unit has been notified of free space information and thus, the free space allocation unit 121 of the RLC processing unit 120-1 with the highest priority is notified of the free space information indicating the maximum size of the free space.

Then, the free space allocation unit 121 of the RLC processing unit 120-1 allocates a portion of the size of free space to the RLC-SDU of the RLC processing unit 120-1 (step S103). At this point, a contiguous sequence of free space in one MAC-PDU is selected by the free space allocation unit 121 as the allocation space of RLC-SDU and the RLC-SDU buffer unit 122, the retransmission buffer unit 123, and the MAC processing unit 130 are notified of the selected allocation space so that the RLC-SDU is allocated to one MAC-PDU without being divided.

When the RLC-SDU buffer unit 122 and the retransmission buffer unit 123 are notified of the allocation space, a new or retransmission RLC-SDU is output to the RLC-PDU creation unit 124 and the RLC-PDU creation unit 124 creates an RLC-PDU by adding an appropriate header of the RLC layer to the RLC-SDU (step S104). At this point, an RLC-PDU is created by preferentially inputting into the RLC-PDU creation unit 124 RLC-PDUs to be retransmitted over new RLC-SDUs, and control information over RLC-PDUs to be retransmitted.

When the radio resource information acquisition unit 131 of the MAC processing unit 130 is notified of the allocation space, the radio resource information acquisition unit 131 determines whether allocation of free space of MAC-PDUs for all the RLC processing units 120-1 to 120-$n$ is completed (step S105). Here, free space has been allocated for only the RLC processing unit 120-1 and thus, the description below will continue by assuming that allocation of free space for all the RLC processing units is not completed (No in step S105).

In this case, the radio resource information acquisition unit 131 subtracts the size of the allocated space for the RLC processing unit 120-1 from the maximum size of the free space for the MAC-PDU to calculate a new free space size for the MAC-PDUs. Then, the RLC processing unit with the highest priority among the RLC processing units not previously notified of free space information is notified of the free space information indicating the calculated size of free space (step S102). Here, only the RLC processing unit 120-1 has been notified of the free space information and thus, the free space allocation unit 121 of the RLC processing unit 120-2 with the second highest priority is notified of the free space information indicating the newly calculated size of the free space.

Then, the free space allocation unit 121 of the RLC processing unit 120-2 allocates a portion of the free space size to the RLC-SDU of the RLC processing unit 120-2 (step S103). At this point, a contiguous sequence of free space in one MAC-PDU is selected by the free space allocation unit 121 as the allocation space for the RLC-SDU and the RLC-SDU buffer unit 122, the retransmission buffer unit 123, and the MAC processing unit 130 are notified of the selected allocation space so that the RLC-SDU is allocated to one MAC-PDU without being divided. If, however, sufficient free space to allocate to the RLC-SDU is not available in either of the two MAC-PDUs, space to be allocated to the divided RLC-SDUs is reserved in each of the MAC-PDUs.

After the RLC-SDU buffer unit 122 and the retransmission buffer unit 123 are notified of the allocation space, a new or retransmission RLC-SDU is output to the RLC-PDU creation unit 124 and the RLC-PDU creation unit 124 creates an RLC-PDU by adding an appropriate RLC layer header to the RLC-SDU (step S104). If the notified size of the allocation space is small and division of the RLC-SDU becomes necessary, the RLC-SDU is divided by the RLC-SDU buffer unit 122 or the retransmission buffer unit 123 to fit to the size of allocation space and the divided data is output to the RLC-PDU creation unit 124. Then, the RLC-PDU creation unit 124 adds an appropriate RLC layer header to each piece of data to create a plurality of RLC-PDUs corresponding to one RLC-SDU.

When the radio resource information acquisition unit 131 of the MAC processing unit 130 is notified of the allocation space, the radio resource information acquisition unit 131 determines whether allocation of free space of a MAC-PDUs for all the RLC processing units 120-1 to 120-$n$ is completed (step S105). Here, free space has been allocated for all the RLC processing units 120-1 to 120-$n$ and thus, the description below will continue by assuming that allocation of free space for all the RLC processing units is completed (Yes in step S105).

The RLC-PDU created by the RLC-PDU creation unit 124 of each of the RLC processing units 120-1 to 120-$n$ is output to the MAC-PDU creation unit 132 of the MAC processing unit 130 and the MAC-PDU creation unit 132 creates MAC-PDUs (step S106). That is, the MAC-PDU creation unit 132 multiplexes each RLC-PDU as a MAC-SDU and adds the header of the MAC layer to the whole of a plurality of MAC-SDUs. In the present embodiment, free space of the two MAC-PDUs corresponding to the two antennas 150-1 and 150-2 is allocated to RLC-PDUs of the RLC processing units 120-1 to 120-$n$ and thus, the MAC-PDU creation unit 132 creates two MAC-PDUs. It is important to note that the indication of a step does not require a specific timing of each event.

Since free space of MAC-PDUs is allocated in such a way that division of RLC-SDU is minimized in the present embodiment, the number of MAC-SDUs contained in the created two MAC-PDUs is minimized. In other words, the proportion of space occupied by headers of the RLC layer in the two MAC-PDUs is reduced to a minimum so that more data may be multiplexed into the MAC-PDUs. As a result, transmission efficiency of data is improved. Moreover, the RLC processing unit allocates free space of MAC-PDUs to RLC-PDUs in descending order of priority and thus, RLC-SDUs with an increasingly higher priority are less likely to be divided. As a result, important data to be prioritized is less likely to be transmitted across a plurality of MAC-PDUs so that QoS control may reliably be exercised.

The two MAC-PDUs created by the MAC-PDU creation unit 132 are output to the Layer 1 processing unit 140 and simultaneously transmitted from the two antennas 150-1 and 150-2 by transmission processing of Layer 1 being performed thereon by the Layer 1 processing unit 140 (step S107). In the present embodiment, an RLC-SDU with a higher priority is multiplexed into one MAC-PDU without being divided and thus, if the MAC-PDU transmitted from one antenna is correctly received on the receiving side, the whole RLC-SDU with a higher priority may be acquired. On the other hand, an RLC-SDU with a lower priority may be multiplexed into two MAC-PDUs after being divided and thus, unless both MAC-PDUs transmitted from the two antennas are correctly received, the whole RLC-SDU with a lower priority may not be acquired on the receiving side.

Figure 6:
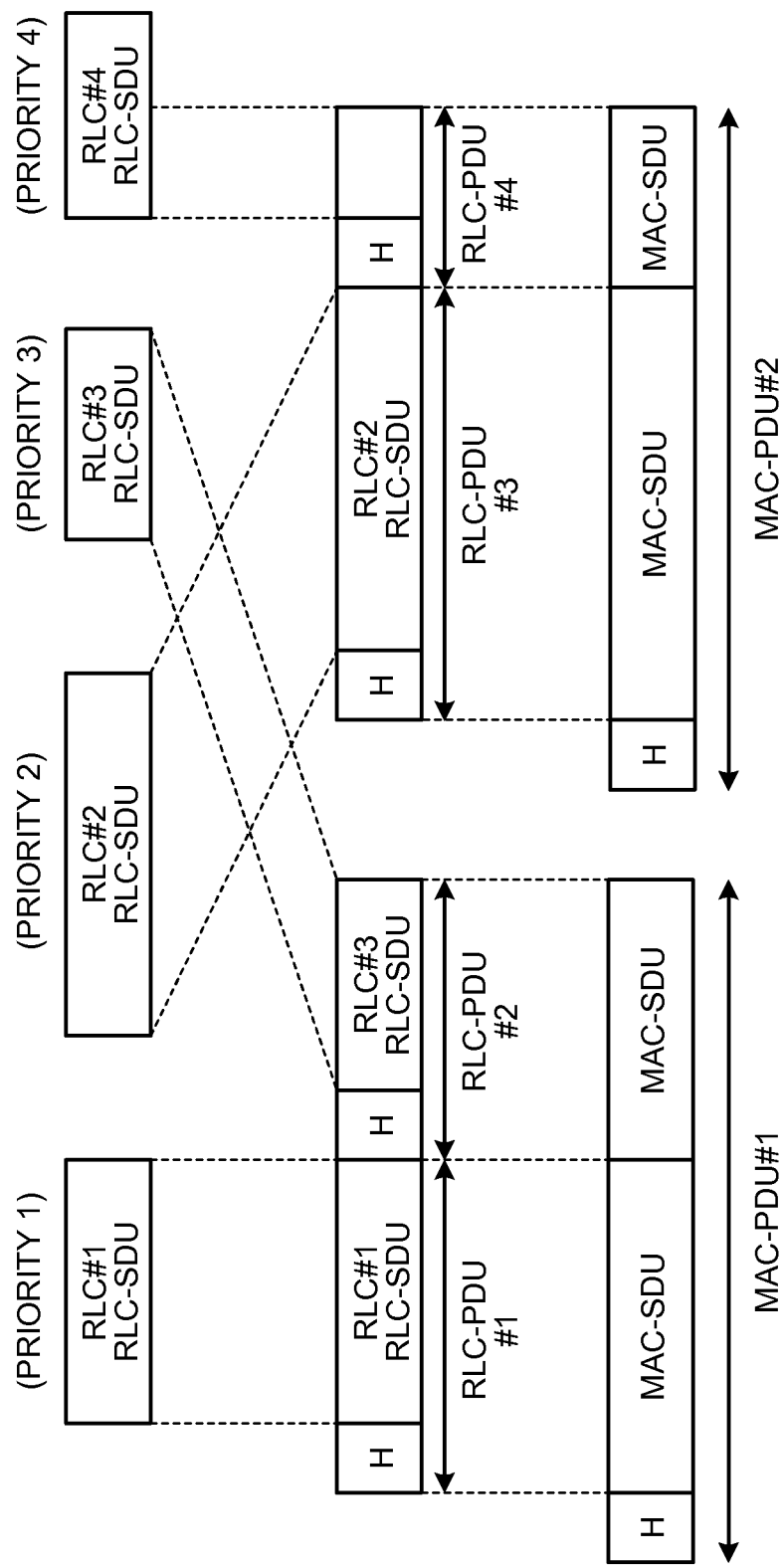
FIG. 6 is a diagram illustrating a concrete example of the transmission data generation related to the first embodiment.

Next, a concrete example of transmission data generation related to the present embodiment will be described with reference to FIG. 6. For the below example a case when a new RLC-SDU is transmitted is considered and it is assumed that there is no transmission of an RLC-PDU to be retransmitted or control information. More specifically, an example will be described when a new RLC-SDU is held in the RLC-SDU buffer unit 122 in each of RLC#1 to #4 corresponding to four RLC processing units and these RLC-SDUs are simultaneously transmitted after being multiplexed into MAC-PDU#1 and #2 corresponding to the two antennas 150-1 and 150-2. It is assumed that the RLC-SDU of the RLC#1 has the highest priority of data followed by the RLC-SDU of the RLC#2, the RLC-SDU of the RLC#3, and the RLC-SDU of the RLC#4.

The RLC#1 has the highest priority and thus, the maximum free space of the two MAC-PDU#1 and #2 is notified from the radio resource information acquisition unit 131 as free space information. The RLC#1 may freely allocate the whole maximum free space of the two MAC-PDU#1 and #2 to the RLC-SDU and so allocates head space of the MAC-PDU#1 to the RLC-SDU so that the RLC-SDU is not divided. Therefore, as illustrated in FIG. 6, the RLC-PDU#1 created by the RLC#1 is multiplexed into the head space of the MAC-PDU#1.

After deciding the allocation space to the RLC-SDU, the RLC#1 notifies the radio resource information acquisition unit 131 of the decided allocation space. After receiving the notification, the radio resource information acquisition unit 131 sets new free space by excluding the space corresponding to the RLC-PDU#1.

Thus, the RLC#2 with the second highest priority is notified of free space excluding the space into which RLC-PDU#1 is (or is to be) multiplexed from the maximum free space of the two MAC-PDU#1 and #2 as free space information. The RLC#2 may allocate the notified free space to the RLC-SDU and so allocates head space of the MAC-PDU#2 to the RLC-SDU so that the RLC-SDU is not divided. That is, the MAC-PDU#1 does not have sufficient free space remaining to be allocated to the RLC-SDU of the RLC#2 and so the head space of the MAC-PDU#2 is allocated to the RLC-SDU to avoid division of the RLC-SDU. Therefore, as illustrated in FIG. 6, the RLC-PDU created by the RLC#2 is to be multiplexed into the head space of the MAC-PDU#2 as RLC-PDU#3.

After deciding the allocation space to the RLC-SDU, the RLC#2 notifies the radio resource information acquisition unit 131 of the decided allocation space. After receiving the notification, the radio resource information acquisition unit 131 sets new free space by excluding the space corresponding to the RLC-PDU#3.

Thus, the RLC#3 with the third highest priority is notified of free space excluding the space into which RLC-PDU#1 and #3 are multiplexed from the maximum free space of the two MAC-PDU#1 and #2 as free space information. The RLC#3 may allocate the notified free space to the RLC-SDU and so allocates the space immediately after the space into which the RLC-PDU#1 of the MAC-PDU#1 is multiplexed, to the RLC-SDU, so that the RLC-SDU is not divided. That is, the MAC-PDU#1 has sufficient free space remaining to be allocated to the RLC-SDU of the RLC#3 and so the space immediately after the RLC-PDU#1 is allocated to the RLC-SDU of the RLC#3. Therefore, as illustrated in FIG. 6, the RLC-PDU created by the RLC#3 is multiplexed into the space immediately after the RLC-PDU#1 as RLC-PDU#2.

After deciding the allocation space to the RLC-SDU, the RLC#3 notifies the radio resource information acquisition unit 131 of the decided allocation space. After receiving the notification, the radio resource information acquisition unit 131 sets new free space by excluding the space corresponding to the RLC-PDU#2.

Thus, the RLC#4 with the fourth highest priority is notified of free space excluding the space into which RLC-PDU#1 to #3 are multiplexed from the maximum free space of the two MAC-PDU#1 and #2 as free space information. The RLC#4 may allocate the notified free space to the RLC-SDU and so searches for free space that may be allocated without dividing the RLC-SDU. However, sufficient free space to multiplex the RLC-SDU does not remain and so the remaining free space of the MAC-PDU#2 is allocated to a portion of the RLC-SDU. That is, only the MAC-PDU#2 has free space remaining that may be allocated to a portion of the RLC-SDU of the RLC#4 and so the space immediately after the RLC-PDU#3 is allocated to a portion of the RLC-SDU of the RLC#4. Therefore, the RLC#4 divides the RLC-SDU by fitting to the size of the allocation space and creates an RLC-PDU from the obtained portion of the RLC-SDU to multiplex the RLC-PDU, as illustrated in FIG. 6, into the space immediately after the RLC-PDU#3 as RLC-PDU#4.

According to the present embodiment, as described above, if the size of free space of a plurality of MAC-PDUs transmitted simultaneously from a plurality of antennas is decided from radio resources, free space of the size that allows multiplexing without dividing the RLC-SDU is reserved for the RLC processing unit in descending order of priority. Thus, the number of divided RLC-SDUs may be minimized and so the number of RLC-PDUs created by adding headers of the RLC layer may be minimized. As a result, radio resources consumed for transmitting headers of the RLC layer may be reduced and also transmission efficiency of data may be improved. RLC-SDUs with an increasingly higher priority are less likely to be divided and thus, multiplexing of data with high demanded QoS across a plurality of MAC-PDUs becomes less likely so that reliable QoS control may be exercised.

[b] Second Embodiment

A second embodiment is characterized in that the size of free space of a MAC-PDU that will be transmitted in the future is estimated and free space of a plurality of MAC- PDUs transmitted chronologically is allocated to RLC-SDUs in descending order of priority.

Figure 7:
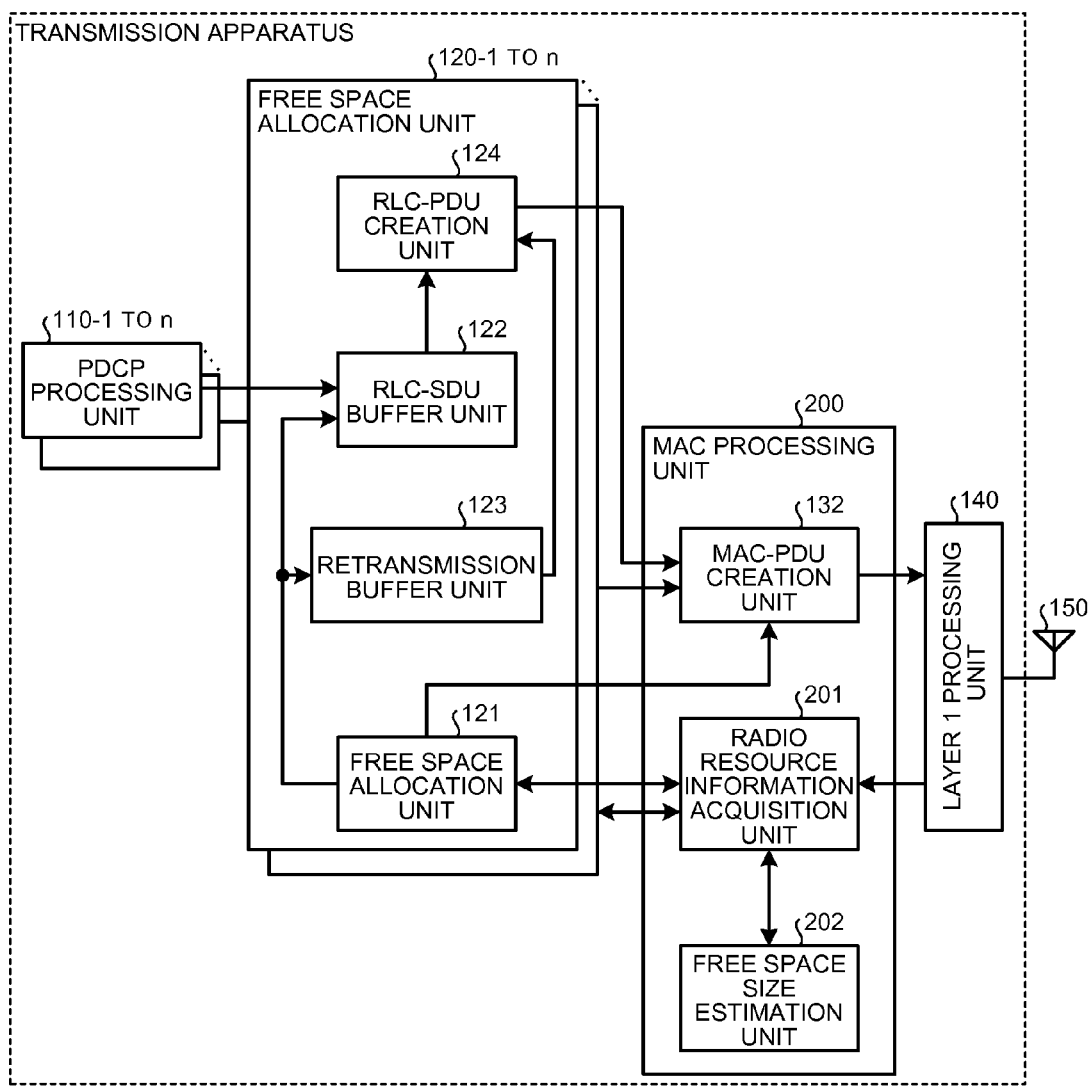
FIG. 7 is a block diagram illustrating main components of the transmission apparatus according to a second embodiment.

FIG. 7 is a block diagram illustrating main components of the transmission apparatus according to the present embodiment. In FIG. 7, the same reference numerals are attached to the same components as those in FIG. 4 and a description thereof is not repeated here. The transmission apparatus illustrated in FIG. 7 includes a MAC processing unit 200, instead of the MAC processing unit 130 of the transmission apparatus illustrated in FIG. 4 and includes only one antenna 150. The MAC processing unit 200 has a configuration in which, instead of the radio resource information acquisition unit 131 of the MAC processing unit 130, a radio resource information acquisition unit 201 and to which a free space size estimation unit 202 is added. The radio resource information acquisition unit 201 acquires information about radio resources currently available for data transmission from the antenna 150 and based on the radio resource information, decides the size of free space of the MAC-PDU currently to be transmitted from the antenna 150. When the size of free space of a MAC-PDU that will be transmitted in the future from the antenna 150 is notified from the free space size estimation unit 202, the radio resource information acquisition unit 201 adds up the size of free space of the MAC-PDU currently to be transmitted and that of free space of the MAC-PDU that will be transmitted in the future to decide the maximum size of free space.

Further, when the allocation space is notified from the free space allocation unit 121 of the RLC processing units 120-1 to 120-n, the radio resource information acquisition unit 201 decides the new size of free space of the MAC-PDU by subtracting the size of allocation space from the size of free space of the MAC-PDU. Then, the radio resource information acquisition unit 201 outputs free space information containing the newly decided size of free space to the free space allocation unit 121 of the RLC processing unit with the highest priority among the RLC processing units not already notified of the free space information indicating the size of free space of the MAC-PDU.

The free space size estimation unit 202 estimates the size of free space of the MAC-PDU that will be transmitted in the future based on channel quality information (CQI) reported from a reception apparatus (not illustrated) to be a transmission destination of the MAC-PDU. More specifically, the free space size estimation unit 202 forecasts CQI that will be received next time and thereafter from a history of CQI received to date. The CQI indicates channel quality between the transmission apparatus and the reception apparatus (not illustrated) and does not normally change significantly in a short time. Therefore, CQI that will be received next time and thereafter may be forecast relatively correctly from a history of CQI to date.

Then, the free space size estimation unit 202 estimates the size of free space of one MAC-PDU or more transmitted subsequent to the MAC-PDU whose size of free space has been decided by the radio resource information acquisition unit 201 from forecast results of CQI. The free space size estimation unit 202 also notifies the radio resource information acquisition unit 201 of the size of free space of the MAC-PDU obtained by estimation. The free space size estimation unit 202 need not necessarily estimate the size of free space of MAC-PDUs that will be transmitted in the future based on CQI. That is, the free space size estimation unit 202 may estimate the size of free space of MAC-PDUs in the future based on, for example, a history of the size of free space of MAC-PDUs to date.

Figure 8:
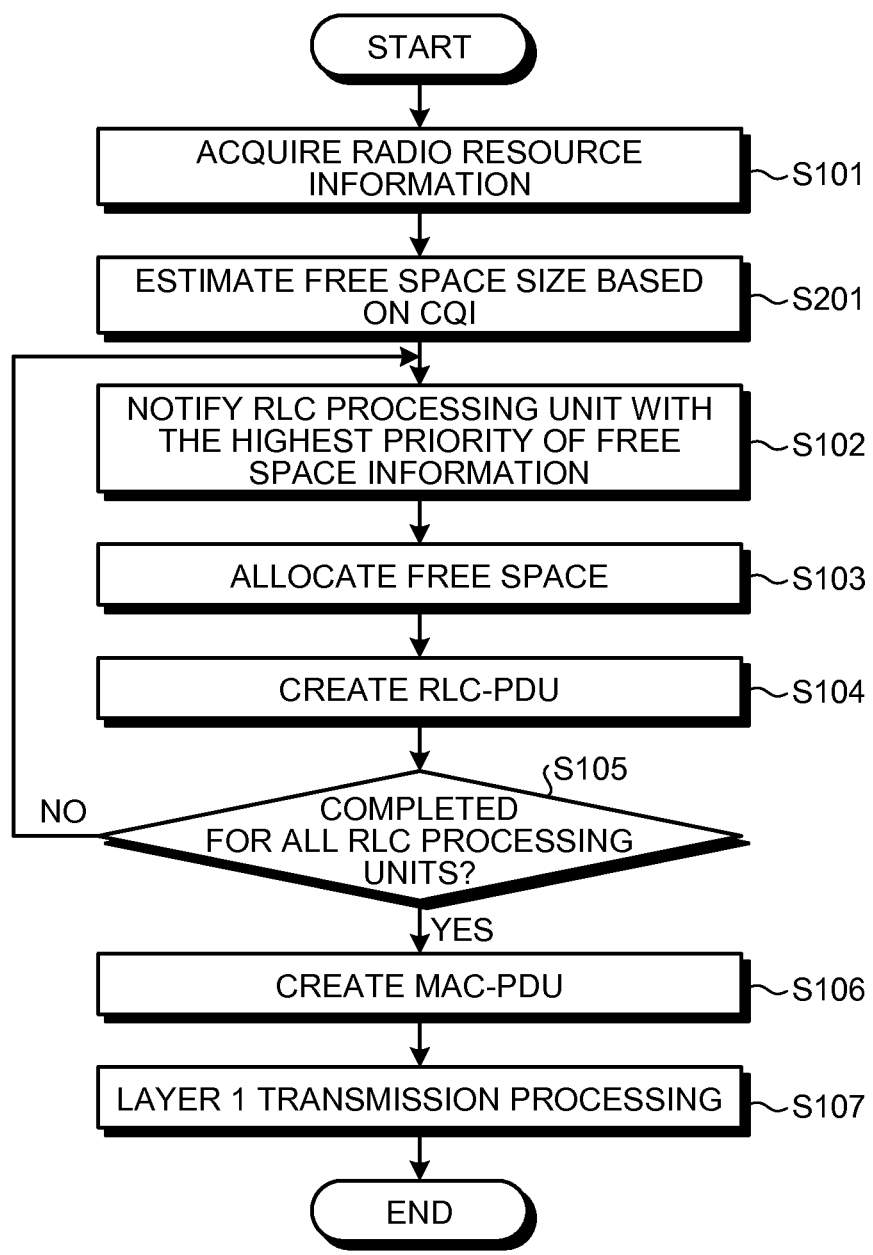
FIG. 8 is a flow chart illustrating the transmission data generation method related to the second embodiment.

Next, a transmission data generation method by a transmission apparatus similarly configured as described above will be described with reference to the flow chart in FIG. 8. In FIG. 8, the same reference numerals are attached to the same steps as those in FIG. 5 and a description thereof is not repeated here.

Radio resources in the antenna 150 constantly change and thus, the radio resource information acquisition unit 201 acquires radio resource information concerning the antenna 150 via the Layer 1 processing unit 140 (step S101). Then, the radio resource information acquisition unit 201 decides the size of free space of the MAC-PDU transmitted currently from the antenna 150 from the radio resource information.

The free space size estimation unit 202 estimates the size of free space of MAC-PDUs that will be transmitted in the future from the antenna 150 based on CQI (step S201). That is, the free space size estimation unit 202 estimates the size of free space of one MAC-PDU or more transmitted subsequent to the MAC-PDU whose size of free space has been decided by the radio resource information acquisition unit 201 from the condition of channel quality to date. The free space size estimation unit 202 notifies the radio resource information acquisition unit 201 of the estimated size of free space of MAC-PDUs and the radio resource information acquisition unit 201 adds up the size of free space of a given number of MAC-PDUs transmitted currently or hereinafter to decide the maximum size of free space. The RLC processing unit with the highest priority among the RLC processing units not notified of free space information is notified of the free space information indicating the size of free space decided by the radio resource information acquisition unit 201 (step S102).

Then, the free space allocation unit 121 of the RLC processing unit notified of the free space information allocates a portion of the size of free space to RLC-SDUs (step S103). At this point, the free space allocation unit 121 selects a contiguous sequence of free space in one MAC-PDU as the allocation space of RLC-SDU so that one MAC-PDU is allocated without the RLC-SDU being divided and notifies the RLC-SDU buffer unit 122, the retransmission buffer unit 123, and the MAC processing unit 200 of the selected allocation space.

After the RLC-SDU buffer unit 122 and the retransmission buffer unit 123 are notified of the allocation space, a new or retransmission RLC-SDU is output to the RLC-PDU creation unit 124 and the RLC-PDU creation unit 124 creates an RLC-PDU by adding an appropriate RLC layer header to the RLC-SDU (step S104).

When the radio resource information acquisition unit 201 of the MAC processing unit 200 is notified of the allocation space, the radio resource information acquisition unit 201 determines whether allocation of free space of MAC-PDUs for all the RLC processing units 120-1 to 120-n is completed (step S105). Hereinafter, like in the first embodiment, the allocation of free space of MAC-PDUs to RLC-SDUs is carried out in all the RLC processing units 120-1 to 120-n.

When the allocation of free space is completed in all the RLC processing units (Yes in step S105), each RLC-PDU created by the RLC-PDU creation unit 124 of the RLC processing units 120-1 to 120-n is output to the MAC-PDU creation unit 132 of the MAC processing unit 200 and the MAC-PDU creation unit 132 creates MAC-PDUs (step S106). Here, not only is the MAC-PDU to be transmitted currently created, but also MAC-PDUs in the future whose size of free space is estimated by the free space size estimation unit 202 are created. MAC-PDUs created by the MAC-PDU creation unit 132 are output to the Layer 1 processing unit 140 and successively transmitted from the antenna 150 by transmission processing of Layer 1 being performed by the Layer 1 processing unit 140 (step S107). It is important to note that the indication of a step does not require a specific timing of each event.

In the present embodiment, an RLC-SDU with a higher priority may be multiplexed into one MAC-PDU without being divided and thus, if one MAC-PDU is correctly received on the receiving side, the whole RLC-SDU with a higher priority may be acquired.

According to the present embodiment, as described above, if the size of free space of a plurality of MAC-PDUs transmitted in different timing is estimated based on radio resources and channel quality, free space of the size that allows multiplexing without dividing the RLC-SDU is reserved for the RLC processing unit in descending order of priority. Thus, the number of divided RLC-SDUs may be minimized in a transmission apparatus including one antenna and so the number of RLC-PDUs created by adding headers of the RLC layer may be minimized. RLC-SDUs with an increasingly higher priority are less likely to be divided and thus, multiplexing of data with high demanded QoS across a plurality of MAC-PDUs becomes less likely so that reliable QoS control may be exercised.

[c] Third Embodiment

A third embodiment is characterized in that, instead of allocating free space of MAC-PDUs to RLC-SDUs in the RLC layer, scheduling of deciding allocation of free space is carried out in the MAC layer.

Figure 9:
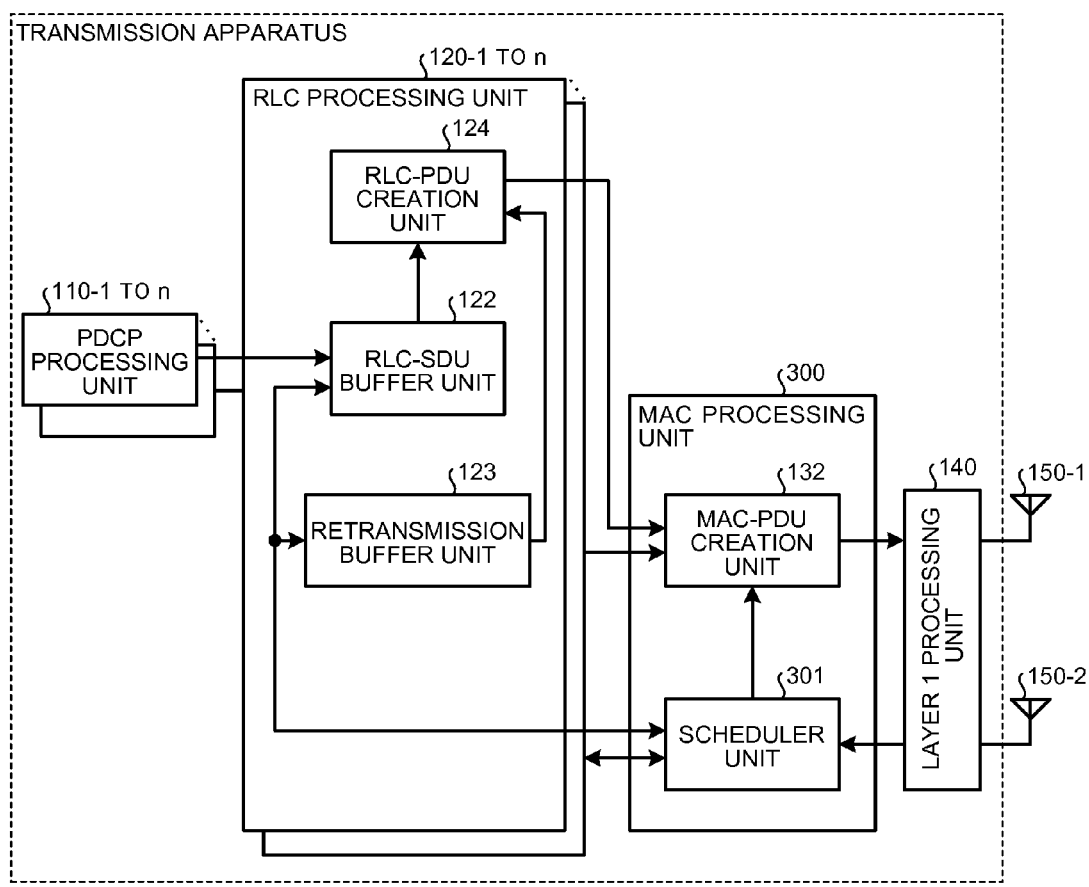
FIG. 9 is a block diagram illustrating main components of the transmission apparatus according to a third embodiment.

FIG. 9 is a block diagram illustrating main components of the transmission apparatus according to the present embodiment. In FIG. 9, the same reference numerals are attached to the same components as those in FIG. 4 and a description thereof is not repeated here. The transmission apparatus illustrated in FIG. 9 includes a MAC processing unit 300, instead of the MAC processing unit 130 of the transmission apparatus illustrated in FIG. 4. The MAC processing unit 300 includes a scheduler unit 301, instead of the radio resource information acquisition unit 131 of the MAC processing unit 130.

The scheduler unit 301 monitors the RLC-SDU buffer unit 122 and the retransmission buffer unit 123 of each of the RLC processing units 120-1 to 120-n to detect the quantity of RLC-SDU(s) holding in the RLC layer. That is, the scheduler unit 301 acquires the amount of data holding in the RLC layer to be transmitted such as a new or retransmission RLC-SDU waiting to be transmitted and control information.

The scheduler unit 301 also acquires information about radio resources available for data transmission from each of the antennas 150-1 and 150-2 to decide the maximum size of free space of MAC-PDUs transmitted from the two antennas based on the information about radio resources.

Then, the scheduler unit 301 carries out scheduling to allocate free space of MAC-PDUs to data holding in the RLC layer held by the RLC processing units 120-1 to 120-n. At this point, the scheduler unit 301 allocates free space of MAC-PDUs that may be allocated without dividing data to holding data holding in the RLC processing unit in descending order of priority.

The scheduler unit 301 notifies the RLC-SDU buffer unit 122 and the retransmission buffer unit 123 in each of the RLC processing units 120-1 to 120-n of the allocation space of the MAC-PDU allocated to holding data in each of the RLC processing units 120-1 to 120-n and also notifies the MAC-PDU creation unit 132 thereof.

A transmission data generation method by a transmission apparatus similarly configured as described above will be described with reference to the flow chart in FIG. 10.

Radio resources in each of the antennas 150-1 and 150-2 constantly change and thus, the scheduler unit 301 acquires radio resource information concerning each of the antennas 150-1 and 150-2 via the Layer 1 processing unit 140 (step S101). Then, the scheduler unit 301 decides the maximum size of free space of the MAC-PDU corresponding to each of the antennas 150-1 and 150-2 from the radio resource information.

The scheduler unit 301 acquires the amount of control information of RLC-PDUs and the RLC layer held in the RLC-SDU buffer unit 122 and the retransmission buffer unit 123 of the RLC processing units 120-1 to 120-n. Accordingly, the amount of holding data in the RLC layer waiting to be transmitted in the RLC processing units 120-1 to 120-n is acquired (step S301).

After the maximum size of free space of MAC-PDUs is decided and the amount of holding data in the RLC layer is acquired, the scheduler unit 301 carries out scheduling to allocate free space of MAC-PDUs to holding data of each of the RLC processing units 120-1 to 120-n (step S302). That is, the scheduler unit 301 first allocates a portion of free space to holding data in the RLC processing unit 120-1 with the highest priority. At this point, a contiguous sequence of free space in one MAC-PDU is selected as the allocation space so that holding data in the RLC processing unit 120-1 is allocated to one MAC-PDU without being divided.

After the allocation space to the holding data in the RLC processing unit 120-1 being selected, the scheduler unit 301 subtracts the size of the allocation space to the holding data in the RLC processing unit 120-1 from the maximum size of free space of the MAC-PDU to calculate the new size of free space of the MAC-PDU. Then, the scheduler unit 301 allocates a portion of new free space to holding data in the RLC processing unit 120-2 with the second highest priority. Also in this case, a contiguous sequence of free space in one MAC-PDU is selected as the allocation space of RLC-SDU so that holding data in the RLC processing unit 120-2 is allocated to one MAC-PDU without being divided. If, however, sufficient free space to allocate to holding data is available in none of the two MAC-PDUs, space to be allocated to the divided holding data is reserved in each of the MAC-PDUs.

Hereinafter, free space of the MAC-PDUs is allocated to holding data of all the RLC processing units 120-1 to 120-n in descending order of priority. When free space is allocated to all holding data, the RLC-SDU buffer unit 122 or the retransmission buffer unit 123 of the RLC processing units 120-1 to 120-n is notified of the allocation space allocated to each piece of holding data (step S303).

When the RLC-SDU buffer unit 122 and the retransmission buffer unit 123 is notified of the allocation space in each of the RLC processing units 120-1 to 120-n, a new or retransmission RLC-SDU is output to the RLC-PDU creation unit 124 and the RLC-PDU creation unit 124 creates an RLC-PDU by adding an appropriate RLC layer header to the RLC-SDU (step S104). If the notified size of allocated space is too small and division of RLC-SDU becomes necessary, the RLC-SDU buffer unit 122 or the retransmission buffer unit 123 divides the RLC-SDU to fit to the size of allocation space and divided data is output to the RLC-PDU creation unit 124. Then, the RLC-PDU creation unit 124 creates a plurality of RLC-PDUs corresponding to one RLC-SDU by adding appropriate RLC layer headers to the respective data.

Each RLC-PDU created by the RLC-PDU creation unit 124 of the RLC processing units 120-1 to 120-n is output to the MAC-PDU creation unit 132 of the MAC processing unit 300 and the MAC-PDU creation unit 132 creates MAC-PDUs (step S106). The MAC-PDUs created by the MAC-PDU creation unit 132 are output to the Layer 1 processing unit 140 and simultaneously transmitted each from the antennas 150-1 and 150-2 by transmission processing of Layer 1 being performed by the Layer 1 processing unit 140 (step S107). It is important to note that the indication of a step does not require a specific timing of each event.

In the present embodiment, holding data of an RLC processing unit with a higher priority is multiplexed into one MAC-PDU without being divided and thus, if an MAC-PDU transmitted from one antenna is correctly received on the receiving side, the whole data of the RLC processing unit with a higher priority may be acquired. On the other hand, holding data of an RLC processing unit with a lower priority may be multiplexed into two MAC-PDUs after being divided. As a result, important data to be prioritized will not be transmitted across a plurality of MAC-PDUs so that QoS control may reliably be exercised.

According to the present embodiment, as described above, if the size of free space of a plurality of MAC-PDUs transmitted simultaneously from a plurality of antennas is decided from radio resources, the amount of holding data in each RLC layer is acquired in the MAC layer and free space of the size that allows multiplexing without dividing the holding data is reserved for the holding data in the RLC layer in descending order of priority.

In each of the above embodiments, a case when a plurality of SDUs of an upper layer, the RLC layer, is multiplexed into PDUs of a lower layer, the MAC layer, has been described, but the present invention is not limited to such a case and may be applied also to between layers other than the RLC layer and the MAC layer. That is, when a plurality of pieces of data of an upper layer is multiplexed into free space in given data transmission units of a lower layer, effects similar to those of each of the above embodiments may be achieved by allocating free space in data transmission units to each piece of data so that division of each piece of data is avoided if possible. In this case, reliable QoS control may be exercised by allocating free space to data in descending order of priority.

A transmission apparatus and a transmission data generation method similar to those described in each of the above embodiments may be realized by generating a transmission data generation program describing the transmission data generation method described in each of the above embodiments in a computer executable form and causing the computer to execute the transmission data generation program. In this case, a computer readable recording medium may be caused to store the transmission data generation program to introduce the transmission data generation program into the computer by using the recording medium. Computer executable code may also be available on a computer readable medium other than the computer readable recording medium which comprise a transitory, propagating signal.

Further, in each of the above embodiments, the RLC layer and the MAC layer of Layer 2 in LTE have been described as an upper layer and a lower layer respectively, but the present invention is not limited to such an example and may be widely applied when a plurality of pieces of data in an upper layer is multiplexed into a plurality of data transmission units of a lower layer in various communication protocols and communication methods.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication apparatus comprising:
    an acquisition unit that acquires a size of free space provided in each of a plurality of data transmission units of a first layer;
    an allocation unit that allocates, to each of a plurality of pieces of data of a second layer in descending order of priority of the plurality pieces of data, a contiguous sequence of free space from among the free space whose size is acquired by the acquisition unit, the contiguous sequence of free space being equal in size to the each of the plurality of pieces of data of the second layer and provided in one data transmission unit of the first layer; and
    a multiplexing unit that multiplexes the plurality of pieces of data of the second layer into the plurality of data transmission units of the first layer according to the allocation of the free space by the allocation unit.

2. The communication apparatus according to claim 1, wherein the allocation unit allocates a free space across the plurality of data transmission units to data of the second layer when no contiguous sequence of the free space equal in size to the data of the second layer is available in one data transmission unit.

3. The communication apparatus according to claim 1, wherein the allocation unit includes a layer processing unit that is provided corresponding to the first layer, collects data amount of the plurality of pieces of data of the second layer, and decides allocation of the free space to each piece of data based on the collected data amount.

4. The communication apparatus according to claim 1, wherein the acquisition unit acquires the size of the free space of a plurality of data transmission units transmitted from mutually different antennas.

5. A transmission data generation method comprising:
    acquiring a size of free space provided in each of a plurality of data transmission units of a first layer;
    allocating, to each of a plurality of pieces of data of a second layer in descending order of priority of the plurality pieces of data, a contiguous sequence of free space from among the free space whose size is acquired, the contiguous sequence of free space being equal in size to the each of the plurality of pieces of data of the second layer and provided in one data transmission unit of the first layer; and
    multiplexing the plurality of pieces of data of the second layer into the plurality of data transmission units of the first layer according to the allocation of the free space at the allocating.

* * * * *